United States Patent
Asada

(10) Patent No.: US 7,977,917 B2
(45) Date of Patent: Jul. 12, 2011

(54) ELECTRIC POWER SUPPLY CONTROL SYSTEM FOR VEHICLE

(75) Inventor: Tadatoshi Asada, Anjo (JP)

(73) Assignee: Denso Corporation, Kariya (JP)

( * ) Notice: Subject to any disclaimer, the term of this patent is extended or adjusted under 35 U.S.C. 154(b) by 521 days.

(21) Appl. No.: 12/222,562

(22) Filed: Aug. 12, 2008

(65) Prior Publication Data

US 2009/0058364 A1    Mar. 5, 2009

(30) Foreign Application Priority Data

Aug. 31, 2007  (JP) ................................ 2007-226917

(51) Int. Cl.
*H02J 7/00*     (2006.01)
*G01N 27/416*   (2006.01)
*G08B 21/00*    (2006.01)
*B60K 8/00*     (2006.01)

(52) U.S. Cl. ........ 320/134; 320/149; 320/155; 324/426; 340/636.1; 340/636.21; 180/53.1; 180/54.1; 180/65.31; 180/199; 323/207; 323/247; 323/265

(58) Field of Classification Search .................... 320/134
See application file for complete search history.

(56) References Cited

U.S. PATENT DOCUMENTS

| | | | | |
|---|---|---|---|---|
| 5,781,013 A * | 7/1998 | Takahashi | ..................... | 324/426 |
| 6,018,690 A | 1/2000 | Saito et al. | | |
| 6,204,633 B1 * | 3/2001 | Kitagawa | ..................... | 320/128 |
| 6,301,674 B1 | 10/2001 | Saito et al. | | |
| 6,704,629 B2 * | 3/2004 | Huang | ............................ | 701/29 |
| 6,791,464 B2 * | 9/2004 | Huang | ..................... | 340/636.15 |
| 6,983,212 B2 * | 1/2006 | Burns | ............................ | 702/63 |
| 2004/0124703 A1 | 7/2004 | Tani et al. | | |
| 2004/0155624 A1 * | 8/2004 | Amano et al. | ................ | 320/104 |
| 2005/0063117 A1 | 3/2005 | Amano et al. | | |
| 2006/0091857 A1 * | 5/2006 | Nakanishi et al. | ............ | 320/116 |

FOREIGN PATENT DOCUMENTS

| | | |
|---|---|---|
| JP | A-5-77680 | 3/1993 |
| JP | A-10-94199 | 4/1998 |
| JP | A-2000-206215 | 7/2000 |
| JP | A-2001-206170 | 7/2001 |
| JP | A-2002-300734 | 10/2002 |
| JP | A-2003-259549 | 9/2003 |
| JP | A-2004-194364 | 7/2004 |
| JP | A-2004-194495 | 7/2004 |

OTHER PUBLICATIONS

Notification of Reasons for Rejection issued for Japanese Application No. 2007-226917 on Jul. 14, 2009.

* cited by examiner

*Primary Examiner* — Edward Tso
*Assistant Examiner* — Yalkew Fantu
(74) *Attorney, Agent, or Firm* — Oliff & Berridge, PLC

(57) ABSTRACT

An electric power supply control system has a battery, a vehicular alternator, large electric power systems, operation limitation target systems, and a battery condition management device. Each large electric power system generates a rush current when initiating its operation by electric power supplied. Each operation limitation target system is capable of limiting its operation for a demand during the operation of the large electric power systems. The large electric power systems and the operation limitation target systems change their operation conditions based on an allowable electric power (or an allowable electric current) supplied from the battery condition management device in order to maintain a terminal voltage of the battery which is not less than a limitation voltage.

11 Claims, 14 Drawing Sheets

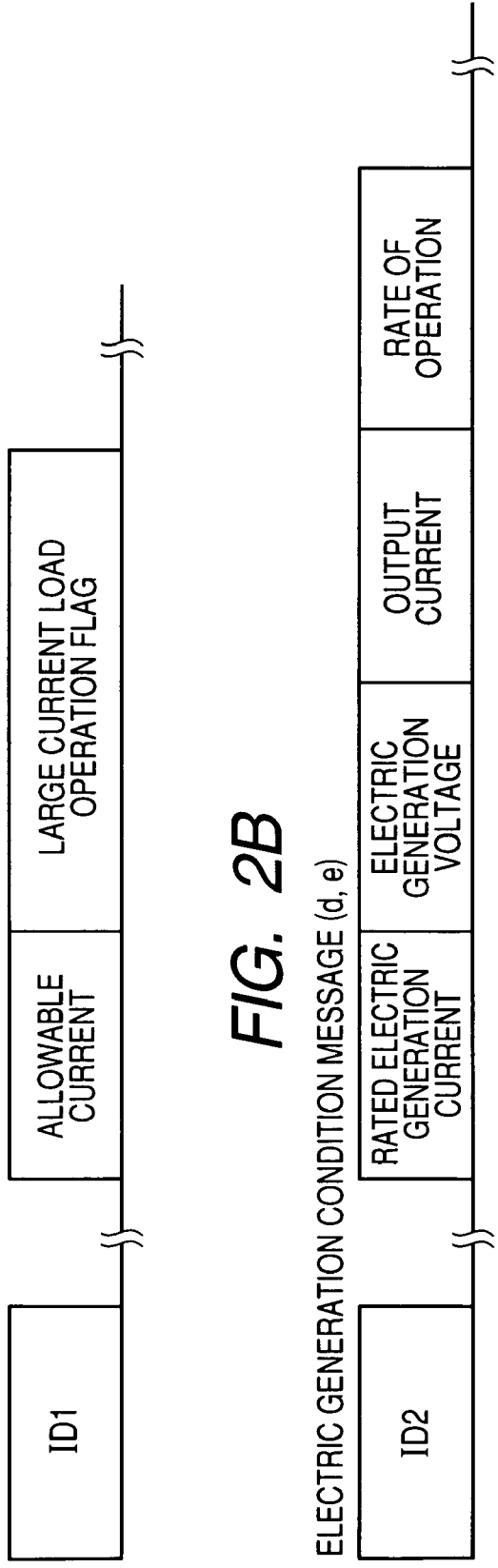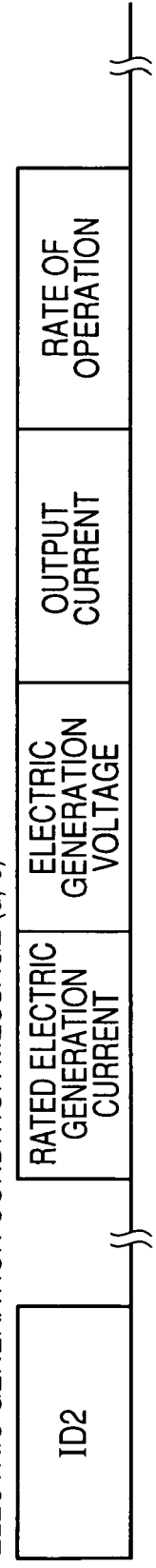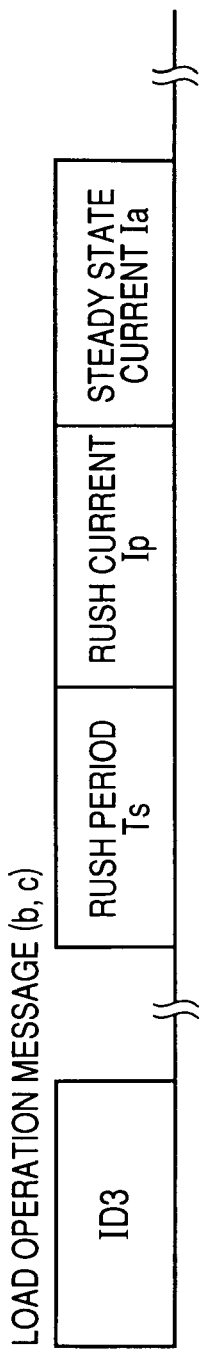

ELECTRIC POWER SUPPLY CONTROL SYSTEM FOR VEHICLE

CROSS-REFERENCE TO RELATED APPLICATION

This application is related to and claims priority from Japanese Patent Application No. 2007-226917 filed on Aug. 31, 2007, the contents of which are hereby incorporated by reference.

BACKGROUND OF THE INVENTION

1. Field of the invention

The present invention relates to an electric power supply control system for a vehicle, namely, to be mounted to a vehicle equipped with an alternator and various types of electric power systems.

2. Description of the Related Art

There has been well known an electric power supply control system capable of performing control of the entire vehicle. The electric power supply control system is capable of supplying electric power accumulated in various electric power sources (such as an alternator and a secondary battery) to on-vehicle devices. Those on-vehicle devices are grouped in function. For example, Japanese patent laid open publication number JP 2002-300734 has disclosed such a conventional electric power supply control system.

There has also been well known an electric power source system which is capable of performing the entire control of a vehicle by detecting a load current of each on-vehicle device and supplying the electric power to the on-vehicle devices. The electric power source system also manages the power consumption of those on-vehicle devices. For example, Japanese patent laid open publication number JP 2004-194364 has disclosed such a conventional electric power source system.

The above conventional techniques disclosed in JP 2002-300734 and JP 2004-194364 involve the following drawbacks (1) to (5) when mounting the total electric power supply control system to the vehicle in order to manage the electric power supply to various types of on-vehicle devices.

(1) A large system is required, and it is also expensive to perform the central management for distributing and supplying electric power to various on-vehicle electrical devices. Because there are various combinations of on-vehicle electrical devices according to vehicle types and devices being used, it is necessary to change or modify the structure of the central management system for every variation. Such a change requires the central management system to be re-designed and therefore requires a lot of works.

(2) It is common knowledge for a designer having skill in this art to design an electric management system to be mounted to a vehicle so that an alternator supplies electric power to on-vehicle electrical devices during a normal operation in order to avoid the battery becoming dead due to energy discharge. Accordingly, there is not necessarily a demand to incorporate the central management system into a vehicle.

(3) However, recently, various types of on-vehicle mechanical devices such as power steering, brakes, and a stabilizer are replaced with electrically driven devices such as an electrical power steering, electrical brakes, and electrical stabilizer. Those electrically driven devices do not always operate. In other words, those electrical devices are driven according to the driving condition of the vehicle. Because those on-vehicle electrical devices need a high level of electrical power which is more than the electric power output from the on-vehicle alternator when those electrical devices operate, the on-vehicle battery must temporarily supply an insufficient amount of the electrical power to those electrical devices. Unfortunately, when the battery falls into a low capacitance condition or when the battery almost reaches the end of its useful lifetime and an inner electrical resistance of the battery is increased, it becomes difficult for the battery to keep the necessary output voltage and to supply an adequate amount of electrical energy to those targeted electrical devices. Due to this inadequate supply of electrical energy the on-vehicle electrical devices are rendered inoperative.

(4) Because those conventional central management systems described above are generally equipped with one or more electrical motors, a rush current occurs when the motor initiates its operation. However, the conventional central management systems do not take such a rush current into account.

(5) Further, when damage occurs in a part of the conventional central management system, which is capable of totally managing the electric power supply to various types of electrical loads using a large amount of electric power mounted to a vehicle, the damage affects all of the electrical loads. In this regard, there has been a strong demand to improve or re-design the conventional central management system in consideration of the importance of safety.

When a vehicle adopts a central management system capable of totally managing the on-vehicle electrical devices and when the central management system is enlarged, it is necessary to perform re-designing of the entire central management system. This requires complicated design work. In general, the response characteristic of the central management system becomes bad or low because it is necessary for the central management system to control the operation of the on-vehicle electrical devices (or loads) after a complete inspection of the condition of the system.

SUMMARY OF THE INVENTION

It is an object of the present invention to provide an electric power supply control system for a vehicle with improved safety, high response characteristic, and enhanced system-expansion capability.

To achieve the above purposes, the present invention provides an electric power supply control system for a vehicle. The electric power supply control system has a battery, electric power generation devices, a primary electric power system, a secondary electric power system, a battery condition management device.

The primary electric power system is operable on receiving electric power and generates a rush current on initiating its operation. The operation of the secondary electric power system is limited according to a demand during the operation of the primary electric power system. The battery condition management device is configured to manage the condition of the battery. In particular, the battery condition management device has a battery monitoring means, an allowable electric power calculation means, and an allowable electric power notice means. The battery monitoring means is configured to detect a charging/discharging current of the battery, and to obtain discharging characteristics of the battery. The allowable electric power calculation means is configured to calculate an allowable electric power of the battery with which the battery becomes dischargeable until a terminal voltage of the battery drops down to a predetermined limit voltage based on the discharging characteristics and discharging current of the battery. The allowable electric power notice means is configured to provide a notice of the allowable electric power to the primary electric power system and the secondary electric power system. In the power supply system, each of the primary electric power systems and the secondary electric power systems changes its operation based on the allowable electric power in order to maintain the terminal voltage of the battery over the limit voltage.

According to the present invention, because the battery management condition device receives the notice regarding the allowable electric power (or an allowable current) transferred from the battery, it is possible for each power supply system to increase the expansibility, safety and responsibility thereof, when compared with the operation of various conventional power supply systems which use a central management control for distributing and supplying electric power to various on-vehicle electrical devices.

BRIEF DESCRIPTION OF THE DRAWINGS

A preferred, non-limiting embodiment of the present invention will be described by way of example with reference to the accompanying drawings, in which:

FIG. 2A to FIG. 2C each shows a structure of each message to be transferred between the electric power supply control system and various types of electric devices as targets under control through communication lines, according to the embodiment shown in FIG. 1;

DETAILED DESCRIPTION OF THE PREFERRED EMBODIMENTS

Figure 1:
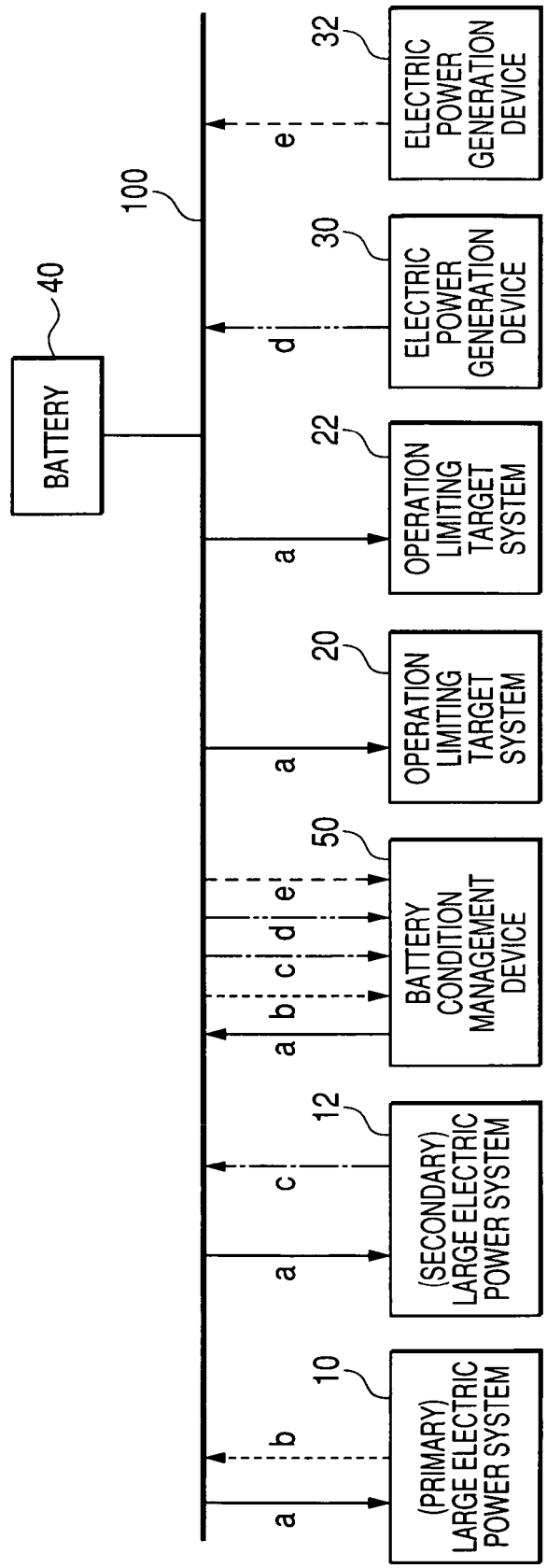
FIG. 1 shows an entire structure of an electric power supply control system for a vehicle according to an embodiment of the present invention.

Hereinafter, various embodiments of the present invention will be described with reference to the accompanying drawings. In the following description of the various embodiments, like reference characters or numerals designate like or equivalent component parts throughout the several diagrams.

Embodiment

A description will be given of the electric power supply control system according to an embodiment of the present invention with reference to FIG. 1 to FIG. 11.

FIG. 1 shows an entire structure of the electric power supply control system for a vehicle according to the embodiment of the present invention.

As shown in FIG. 1, the electric power supply control system according to the embodiment is comprised of large electric power systems 10 and 12, operation limiting target systems 20 and 22, electric power generation devices 30 and 32, a battery 40, a battery condition management device 50.

Each of those large electric power systems 10 and 12 includes an electrical load which generates a rush current on initiating its operation, and operates with an electric power to be supplied from outside. Each of the large electric power systems 10 and 12 controls the operation of the electrical load.

Each of the operation limiting target systems 20 and 22 includes an electrical load. The operation of this electrical load in each operation limiting target system is limited, namely, controlled according to necessity during the operation of the large electric power systems 10 and 12. Thus, each operation limiting target system controls the operation of its electrical load.

Each of the electric power generation devices 30 and 32 is driven with the power transmitted from an internal combustion engine mounted to the vehicle, so that each of the electric power generation devices 30 and 32 generates an electric power. For example, a vehicular alternator corresponds to the electric power generation devices 30 and 32.

The battery 40 electrically charges the electric power which is supplied from at least one of the electric power generation devices 30 and 32. The battery 40 also supplies the electric power charged therein to the large electric power systems 10 and 12 and the operation limiting target systems 20 and 22 according to demand.

The battery condition management device 50 manages the condition of the battery 40, and further controls the operation of the large electric power systems 10 and 12 and the operation limiting target systems 20 and 22.

The large electric power systems 10 and 12, the operation limiting target systems 20 and 22, the electric power generation devices 30 and 32, the battery 40, and the battery condition management device 50 are communicated to each other through the communication lines 100 shown in FIG. 1 and through electric power cables (not shown).

Various types of messages are transferred between those systems and devices 10, 12, 20, 22, 30, 32, 40, and 50 through the communication lines 100. As shown in FIG. 2A to 2C, following messages are transferred between those systems and devices:

Allowable current message (a);
Electric generation condition message (d, e); and
Load operating message (b, c).

The above reference characters such as (a), (d, e), and (b, c) correspond to characters (a), (d, e), and (b, c) shown in FIG. 1 and FIG. 2A to FIG. 2C.

FIG. 2A to FIG. 2C, each shows a structure of (or data items in) each message. Those messages shown in FIG. 2A to FIG. 2C are transferred between those systems and devices 10, 12, 20, 22, 30, 32, 40, and 50 through the communication lines 100 (shown in FIG. 1).

As shown in FIG. 2A, the allowable current message (a) contains an identification flag ID1, an allowable current, and a larger current load operation flag. As shown in FIG. 2B, the electric generation condition message (d, e) contains an identification flag ID2, a rated electric generation current, an electric generation voltage, an output current, and an operating ratio. As shown in FIG. 2C, the load operating message (b, c) contains an identification flag ID3, a rush period of time, a rush current Ip, and a steady-state current Ia.

Figure 3:
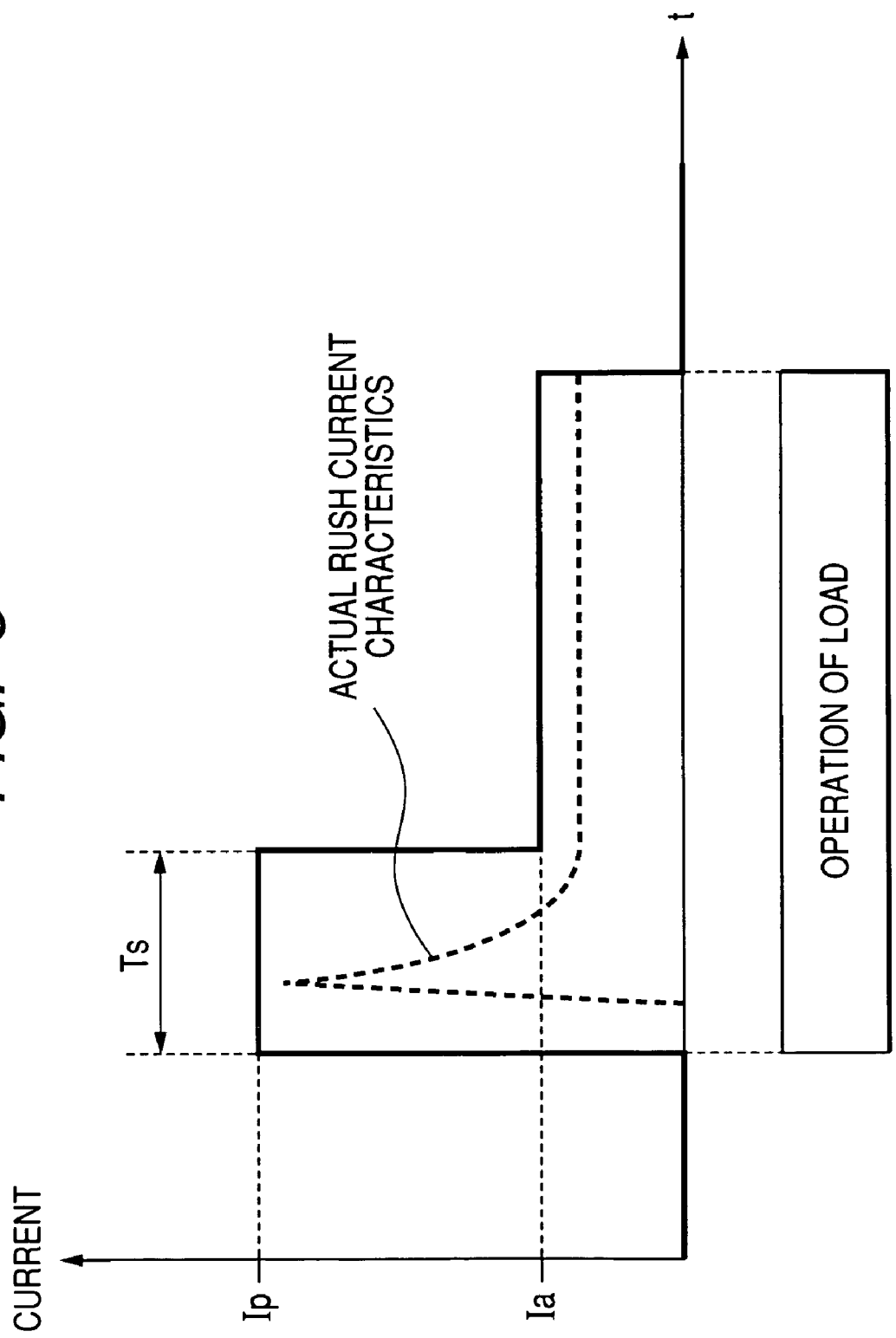
FIG. 3 shows a relationship between operation state of a large electric power system and its driving current.

FIG. 3 shows a relationship between the operation state of the large electric power systems 10 and 12 and its driving current.

In FIG. 3, the label "OPERATION OF LOAD" indicates that a large current load (such as an electrical power steering, and actual examples thereof will be explained later in detail) corresponding to the large electric power systems 10 and 12 are now in operation.

A rush current is generated when each large current load (corresponding to each large electric power system 10 and 12) initiates its operation. As shown with a dotted line, the current is rapidly increased when the large current load initiates its operation and rapidly decreased immediately following its peak. After this, the current is gradually decreased and approaches its steady-state.

The time from the initiation of operation to the steady-state is a rush period Ts. The driving current for the large electric power systems 10 and 12 serves as the rush current Ip of a constant value which flows during the rush period Ts and the steady-state current Ia which flows in the large current loads 10 and 12.

Figure 4:
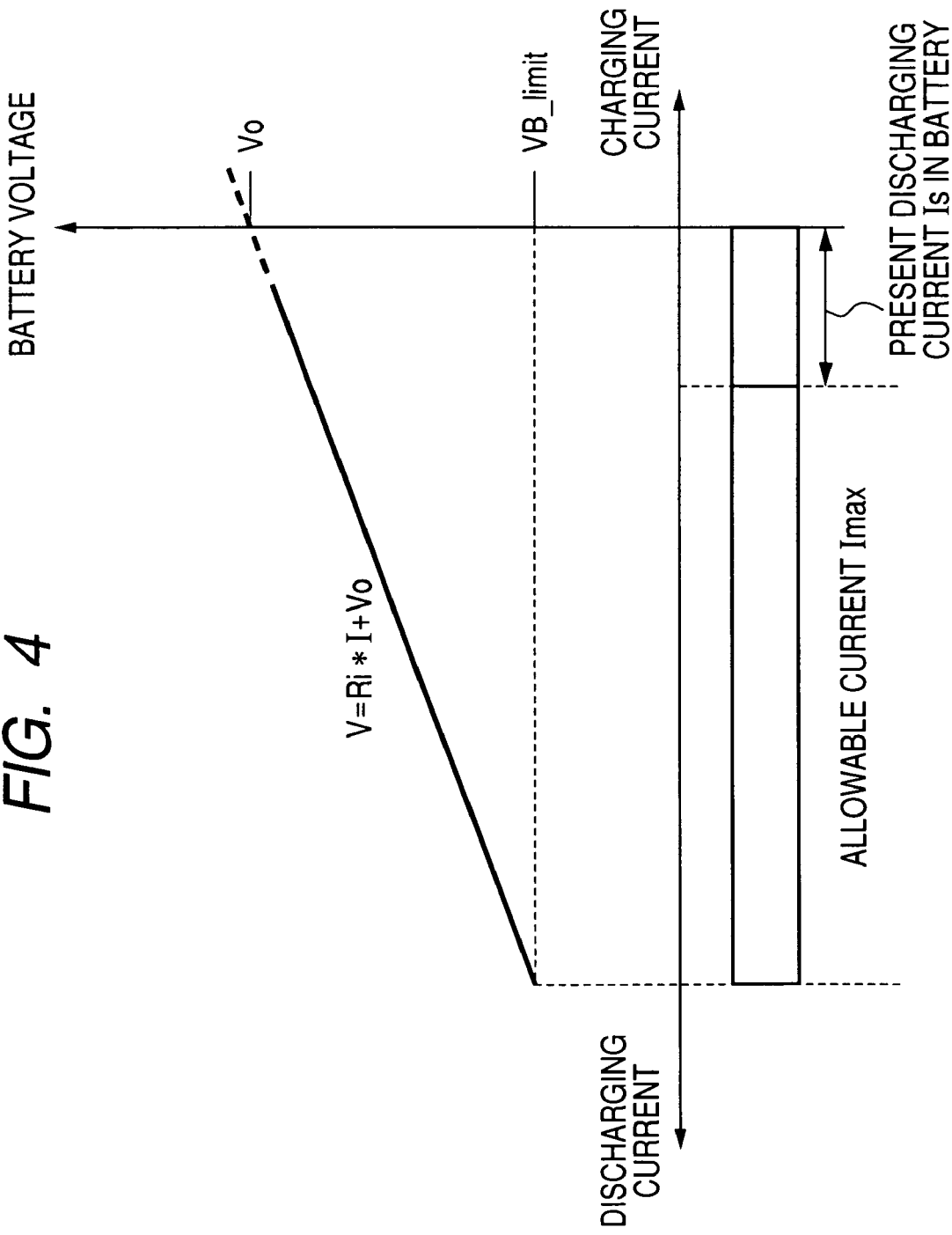
FIG. 4 shows a relationship between discharging characteristics of and an allowable current in a battery mounted to the vehicle.

FIG. 4 shows a relationship between battery discharging characteristics and an allowable current Imax in the battery mounted to the vehicle. In FIG. 4, "Vo" indicates an open voltage of the battery 40, "VB_limit" denotes a limitation voltage, "Is" designates a discharging current of the battery 40 at a current time, "Imax" indicates an allowable current, "Ri" denotes an internal resistance of the battery 40, and "V" designates battery discharging characteristics corresponding to the current I.

Obtaining the battery discharging current Is and the like at the current time using the battery discharging characteristics V enables the allowable current Imax to be calculated. This allowable current Imax corresponds to the limitation voltage "VB_limit" to which the terminal voltage of the battery 40 drops down.

Figure 5:
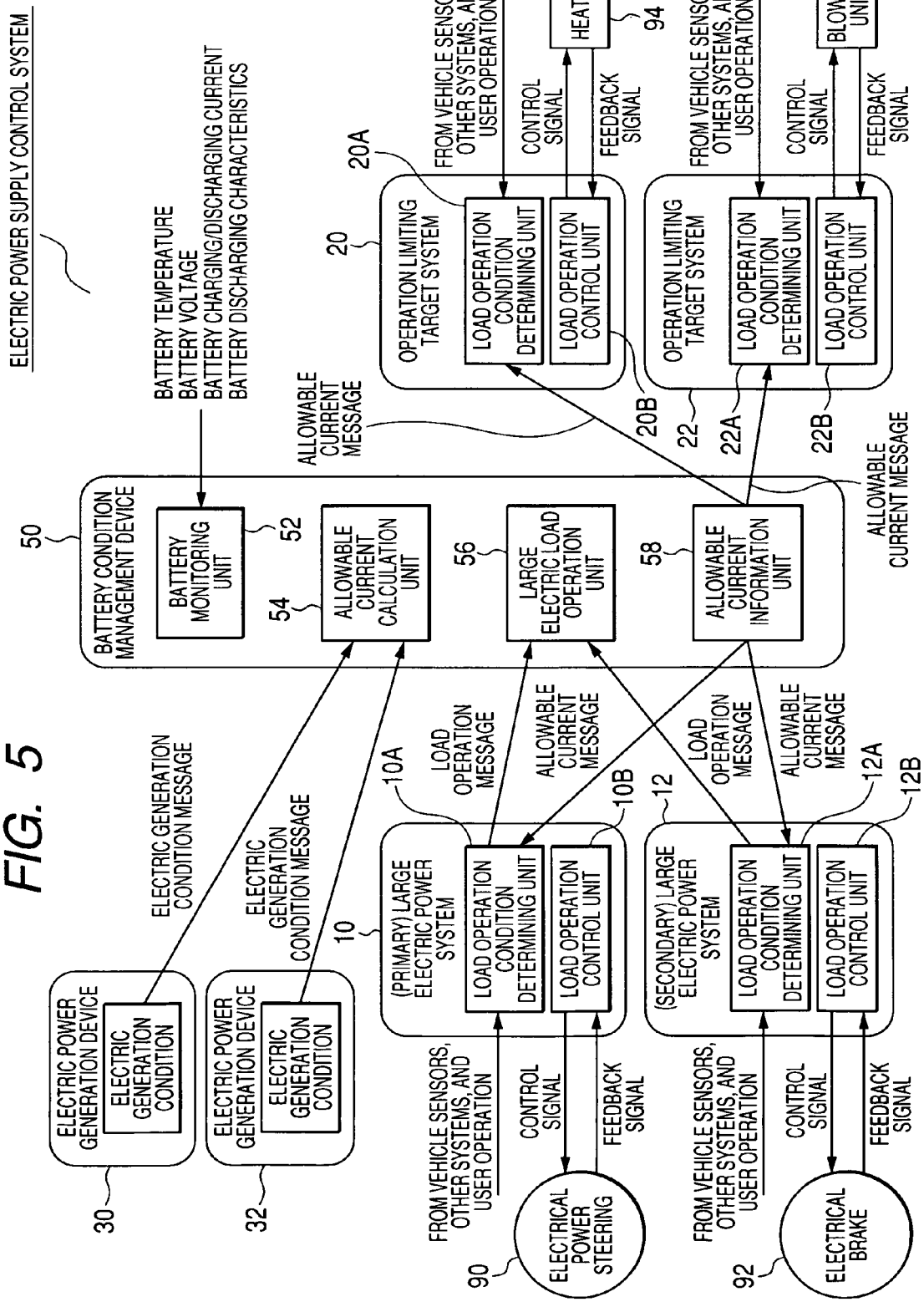
FIG. 5 is an explanatory view for the operation state of a battery condition management device in the electric power supply control system for a vehicle according to the embodiment of the present invention.

FIG. 5 is an explanatory view for the operation state of the power control system mounted to the vehicle according to the embodiment of the present invention.

The large electric power system 10 has a load-operation condition determining unit 10A and a load operation control unit 10B which manage the operation of a load such as an electrical power steering 90 shown in FIG. 5.

The load-operation control unit 10B outputs a control signal to the large current load and then receives a feedback signal from the load in order to control the operation of an electrical power steering 90 as the larger current load.

The large electric power system 12 has a load-operation condition determining unit 12A and a load-operation control unit 12B.

The load operation control unit 12B outputs a control signal to an electrical brake 92 as the large current load, and receives a feedback signal from the electrical brake 92 in order to control the operation of the electrical brake 92.

The operation limiting target system 20 has a load-operation condition determining unit 20A and a load operation control unit 20B.

The load operation control unit 20B outputs a control signal to a heater 94 as a target load in limitation, and receives a feedback signal from the heater 94 in order to control the operation of the heater 94.

Similar to the operation limiting target system 20, the operation limiting target system 22 has a load operation condition determining unit 22A and a load operation control unit 22B.

The load operation control unit 22B outputs a control signal to a blower unit 96 as a target load in limitation, and receives a feedback signal from the blower unit 96 in order to control the operation of the blower unit 96.

The battery condition management device 50 is comprised of a battery monitoring unit 52, an allowable current calculation unit 54, a large electric load operation management unit 56, and an allowable current information unit 58.

The battery monitoring unit 52 monitors or detects a terminal voltage of the battery 40 and a temperature of the battery 40, and obtains the discharging characteristics of the battery 40.

Updating the discharging characteristics of the battery 40 according to the change of the temperature of the battery 40 improves the accuracy of the discharging characteristics of the battery 40.

The allowable current calculation unit 54 calculates the allowable current Imax which corresponds to the ability of discharging the terminal voltage of the battery 40 until this terminal voltage drops down to a predetermined limitation voltage VB_limit (see FIG. 4).

The large electric load operation management unit 56 gives the large electric power systems 10 and 12 permission to operation when the calculated allowable current Imax exceeds the rush current Ip.

The allowable current information unit 58 transfers the information regarding the calculated allowable current and the permission to operate to the operation limiting target systems 20 and 22.

This transmission of the above information is performed using the allowance current message (a) shown in FIG. 2A prescribed above.

The large electric power systems 10 and 12 correspond to a primary electric power system. The operation limiting target systems 20 and 22 correspond to a secondary electric power system. The battery monitoring unit 52 corresponds to a battery monitoring means. The allowable current calculation unit 54 corresponds to an allowable electric power calculation means. The allowable current information unit 58 corresponds to an allowable electric power notice means. The large electric load operation management unit 56 corresponds to an electric load operation management means.

A description will now be given of the operation of the electric power supply control system having the above structure according to the embodiment of the present invention.

Figure 6:
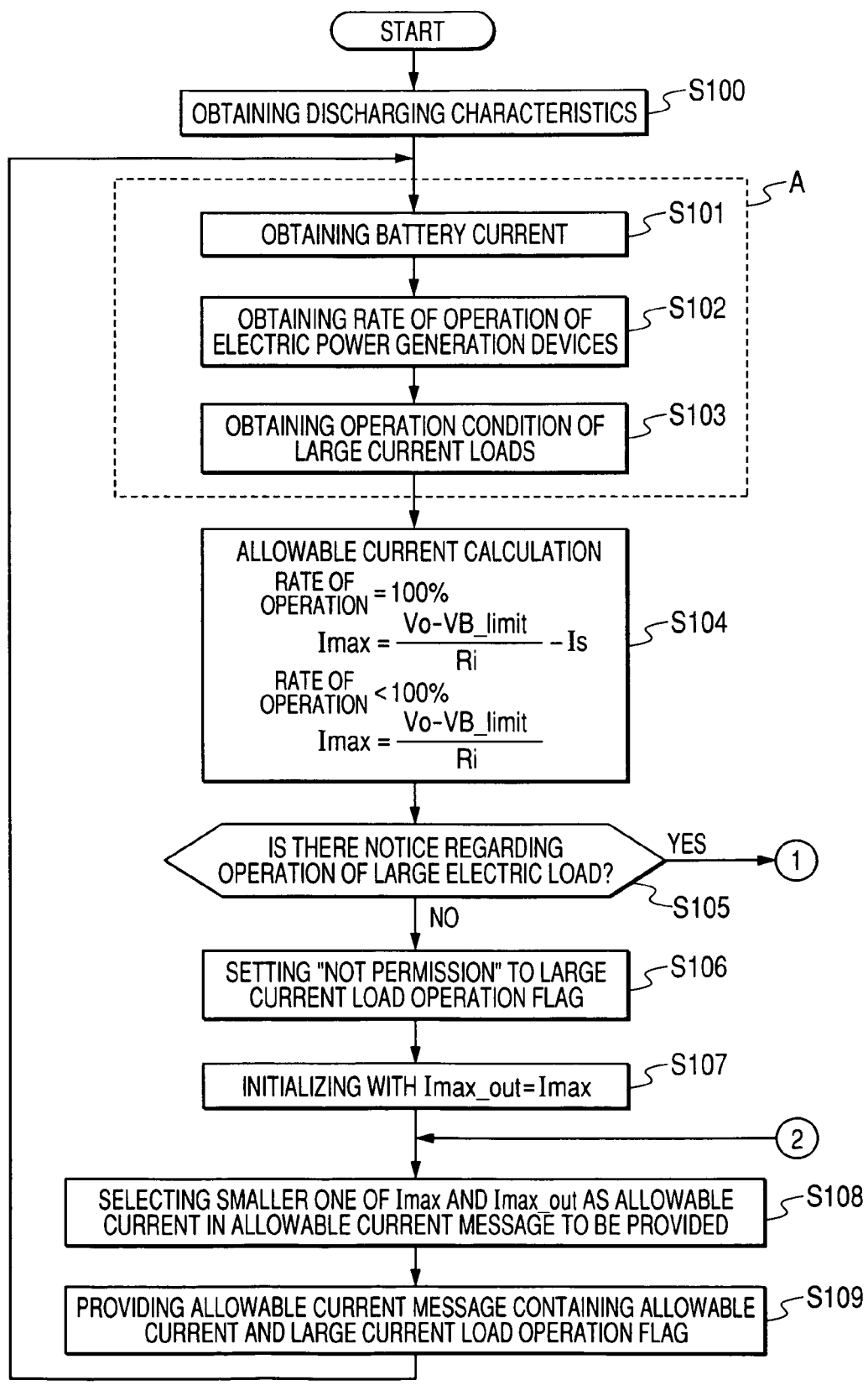
FIG. 6 is a flow chart showing entire operation of the battery condition management device in the electric power supply control system according to the embodiment.
Figure 7:
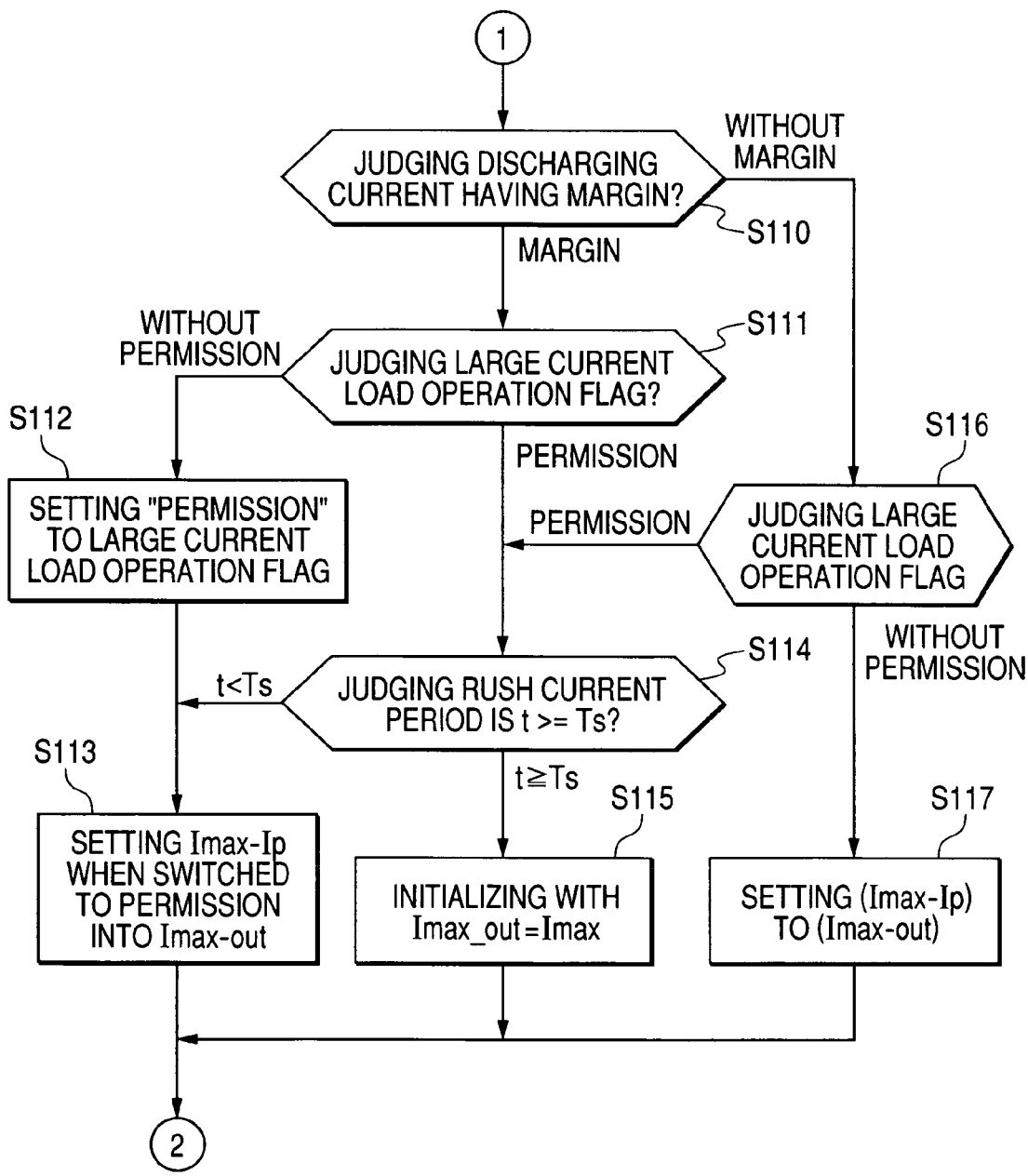
FIG. 7 is a flow chart further showing the operation process of the battery condition management device in the flow chart shown in FIG. 6.

FIG. 6 and FIG. 7 show the entire operation of the battery condition management device 50 as a control target of the electric power supply control system according to the embodiment.

When the driver of a vehicle turns a key switch ON (omitted from Figures), the battery condition management device 50 initiates its operation. The battery monitoring unit 52 gets the discharging characteristics of the battery 40 (step S100). For example, the battery monitoring unit 52 gets the voltage-current characteristics of the battery 40 when the internal combustion engine of the vehicle initiates its operation by a starter (not shown).

Next, the battery monitoring unit 52 gets a battery current (step S101). The allowable current calculation unit 54 in the battery condition management device 50 gets a rate of operation (or an availability) of each of the electric power generation devices 30 and 32 (step S102) by receiving the electric generation condition message having the data format shown in FIG. 2B.

The large electric load operation management unit 56 receives the load operation message ((c) shown in FIG. 2C) including the information regarding the operation condition of the large electric loads transferred from the load-operation condition determining units 10A and 12A in the large electric power systems 10 and 12 (step S103).

It is desirable to perform the operation of a set of those steps S101, S102 and S103 within a short period of time (for example, within not more than 10 ms) when compared with a long period of time for a main operation loop from step S101 to step S109 because a response speed to the detection accuracy of current and the operation of the large electric loads can be increased. In addition, it is preferred to set the short period of time within not more than 1/10 times of the response time of the electric power supply by the electric power generation devices 30 and 32.

Next, the allowable current calculation unit 54 calculates based on the charging characteristics and the battery discharging current of the battery 40 the allowable current Imax which is dischargeable until the terminal voltage of the battery 40 drops down to the predetermined limitation voltage VB_limit (shown in FIG. 4) (step S104).

The allowable current calculation unit 54 calculates the allowable current Imax using a different calculation equation according to the rate of operation (or operational efficiency) of each of the electric power generation devices 30 and 32 (step S104). As a concrete example, the allowable current calculation unit 54 uses following equations (E1) and (E2) according to the value (100% or less than 100%) of the rate of operation (or operational efficiency):

(E1) Imax = (Vo − VB_limit)/Ri − Is  (Rate of operation = 100%); and
(E2) Imax = (Vo − VB_limit)/Ri  (Rate of operation <100%), where 100% indicates having a margin of the rate of operation (or operational efficiency), and less than 100% indicates having no margin. When the rate of operation (or operational efficiency) has an adequate margin, the battery discharging current Is is set to zero (Is=0) when the allowable current Imax is calculated.

Next, the large electric load operation management unit 56 judges whether or not it receives the notice of operation of the large electric loads (such as the electrical power steering 90 and the electrical brake 92) transferred from the corresponding large electric power systems 10 and 12 (step S105).

The large electric power systems 10 and 12 corresponding to the large electric loads transfer the "operation notice" using the load operation message shown in FIG. 2C to the large electric load operation management unit 56. The judgment result at step S105 indicates that large electric load operation management unit 56 does not receive any notice of operation, namely, not receives the load operation message, the operation flow goes to step S106. At step S106, the allowable current information unit 58 sets the value of the large current load operation flag contained in the allowable current message shown in FIG. 2A to "Not allowed" (step S106). The allowable current information unit 58 then initializes the variable Imax_out using the allowable current Imax which has already been calculated in step S104 (step S107).

Next, the allowable current information unit 58 selects the smaller one of Imax and Imax_out, and sets the selected one as the "allowable current" which would be set in the allowable current message (a) shown in FIG. 2A (step S108). The allowable current information unit 58 transfers the allowable current message (a) containing the information regarding the "allowable current" and the "large current load operation flag" to the load-operation condition determining unit 10A and the load-operation control unit 10B in the large electric power systems 10 and 12, respectively (step S109). Following the step S109, the operation flow returns to step S101. Then, the series of operation from step S101 to step S109 is iterated.

On the other hand, when the judgment result at step S105 indicates that the large electric load operation management unit 56 receives the notice of operation transferred from the large electric power systems 10 and 12 corresponding to the large electric loads 90 and 92 ("YES" in step S105), the operation flow goes to step S110 shown in FIG. 7. In step S110, the large electric load operation management unit 56 further judges whether or not electrical power can still be discharged (hereinafter referred to as the "margin" or the "discharging margin") of the battery 40 at step S110 shown in FIG. 7. This judgment at step S110 is performed by comparing the allowable current Imax calculated at step S104 with the rush current Ip. Specifically, when Imax>Ip, the judgment result indicates that the battery 40 has the "discharging margin". On the other hand, when Imax≦Ip, the battery 40 has no "discharging margin".

When the judgment result at step S110 indicates that the battery 40 has the "discharging margin", the operation flow goes to step S111. At step S111, the large electric load operation management unit 56 judges whether or not the "operation permission" is issued. This judgment is performed by checking the value of the "large current load operation flag" contained in the allowable current message (a) (see FIG. 2A). When the value of the large current load operation flag indicates "no operation permission", the allowable current information unit 58 changes the value of the large current load operation flag contained in the allowable current message to "permission" at step S112 shown in FIG. 7, and calculates the value by subtracting the rush current IP from the allowable current Imax when the above large current load operation flag is changed to the "operation permission", and then sets the calculated value to the variable Imax_out (step S113). After this, the operation flow goes to step S108 shown in FIG. 6.

On the other hand, the large electric load operation management unit 56 judges at step S11 that there is an "operation permission", the operation flow goes to step S114. In step S114, the large electric load operation management unit 56 judges whether or not the operation time "t" of the large electric loads corresponding to the large electric power systems 10 and 12 is within a predetermined rush period time "Ts".

When the judgment result indicates that the operation time "t" is within the rush period time "Ts" (t<Ts), the operation flow goes to step S113. In step S113, the allowable current information unit 58 subtracts the rush current Ip from the allowable current Imax, and sets the subtraction result to the variable Imax_out.

On the other hand, the judgment result in step S114 indicates that the operation time "t" is not within the rush period time "Ts" (t≧Ts), the operation flow goes to step S115. In step S115 shown in FIG. 7, the allowable current information unit 58 initializes the variable Imax_out, namely, sets the allowable current Imax to the variable Imax_out. The operation flow then goes to step S108 shown in FIG. 6.

On the other hand, when the judgment result in step S110 indicates that there is "no discharging margin", the large electric load operation management unit 56 judges in step S116 (shown in FIG. 7) whether or not the "operation permission" is issued. Like step S111, this judgment at step S116 is performed by checking the value of the "large current load operation flag" contained in the allowable current message (a) (see FIG. 2A). The operation flow then goes to step S114 when the judgment result indicates the presence of the "operation permission" in the large current load operation flag.

In step S114, the large electric load operation management unit 56 judges whether or not the operation time "t" of the large electric loads corresponding to the large electric power systems 10 and 12 is within a predetermined rush period time "Ts".

On the other hand, when the judgment result in step S116 indicates that there is "no operation permission", namely, when there is no discharging margin in the battery 40 and the large current load operation flag indicates the "no permission", it is difficult to obtain the operation current for the large current loads. The allowable current information unit 58 subtracts the rush current Ip from the allowable current Imax, and then sets the calculated one to the variable Imax_out (step S117). The operation flow then goes to step S108 shown in FIG. 6.

The battery condition management device 50 performs the series of the operations described above.

Figure 8:
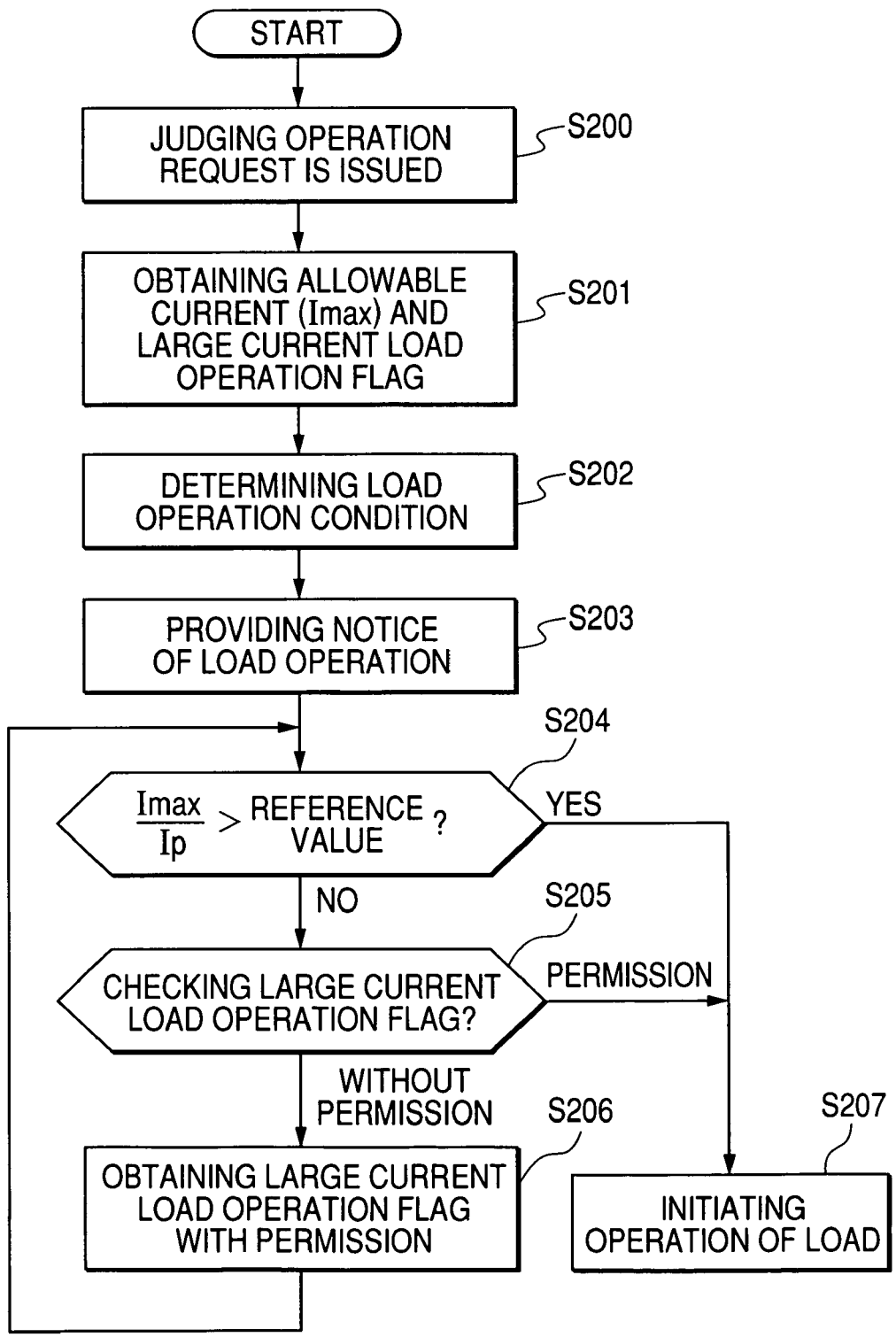
FIG. 8 is a flow chart showing an operation of the large electric power systems in the electric power supply control system for a vehicle according to the embodiment of the present invention.

FIG. 8 is a flow chart showing the operation of the large electric power systems 10 and 12 in the electric power supply control system according to the embodiment of the present invention.

Each of the large electric power systems 10 and 12 independently operates based on the operation process shown in FIG. 8. The operation of one of the large electric power systems 10 will now be explained.

When the driver of the vehicle turns ON the key switch (omitted from Figures), the large electric power system 10 initiates its operation.

The load-operation condition determining unit 10A judges whether or not there is an "operation request" in step S200, and then receives the allowable current message shown in FIG. 2A transferred from the allowable current information unit 58. The allowable current information unit 58 gets the "allowable current Imax" and the "large current load operation flag" contained in the allowable current message ((a) shown in FIG. 2A) (step S201).

Next, the load operation condition determining unit 10A determines the operation condition of the corresponding large current load (such as the electrical power steering 90) in step S202. Because the allowable current Imax has already been obtained, it is possible in consideration of the allowable current Imax, to perform the large current load as fast as possible.

Next, the load-operation condition determining unit 10A transfers the notice of the load operation with the load operation message ((c) shown in FIG. 2C) to the large electric load operation management unit 56 in the battery condition management device 50 (step S203).

That is, this transmission of the notice of load operation uses the load operation message (c) shown in FIG. 2C, and thereby enables the battery condition management device 50 to supply an adequate amount of the operation current. When the battery condition management device 50 is operated, operational stability for the entire electrical power supply control system for the vehicle is increased.

Next, the load-operation condition determining unit 10A judges whether or not the ratio "Imax/Ip" is more than a reference value which indicates the margin (step S204). For example, when the electric power supply control system contains the large electric power systems 10 and 12 which simultaneously operate, like the embodiment of the present invention, the value "two" is set as the reference value (the reference value=2). When the ratio "Imax/Ip" is more than the reference value (when Imax/Ip>2), it is possible to decrease a load response delay under the good condition of the battery 40 which stores an adequate amount of electric power, when the ratio "Imax/Ip" is not less than the reference value (=2) and the large electric load is so controlled to be operable without receiving the "operation permission" in the large current load operation flag in the allowable current message (a) shown in FIG. 2A.

When the ratio "Imax/Ip" is not more than the reference value (when Imax/Ip≦2), that is, when there is no margin of the allowable current Imax, the operation flow goes to step S205.

At step S205, the load operation condition determining unit 10A checks the value of the large current load operation flag contained in the allowable current message shown in FIG. 2A.

When the large current load operation flag indicates the "no permission", the load operation condition determining unit 10A waits to get the large current load operation flag indicating the "permission" (step S206). The operation flow then returns to step S204. The series of step S204 and S206 is iterated.

In step S204, when the judgment result indicates that the ratio "Imax/Ip" is more than the reference value, namely, when there is an adequate amount of allowable current Imax ("YES" in step S204), or when the large current load operation flag indicates the "operation permission" (step S205), the load-operation condition determining unit 10B starts to operate the corresponding large current load (step S207). As described above, the large electric power system 10 performs the above steps.

Figure 9:
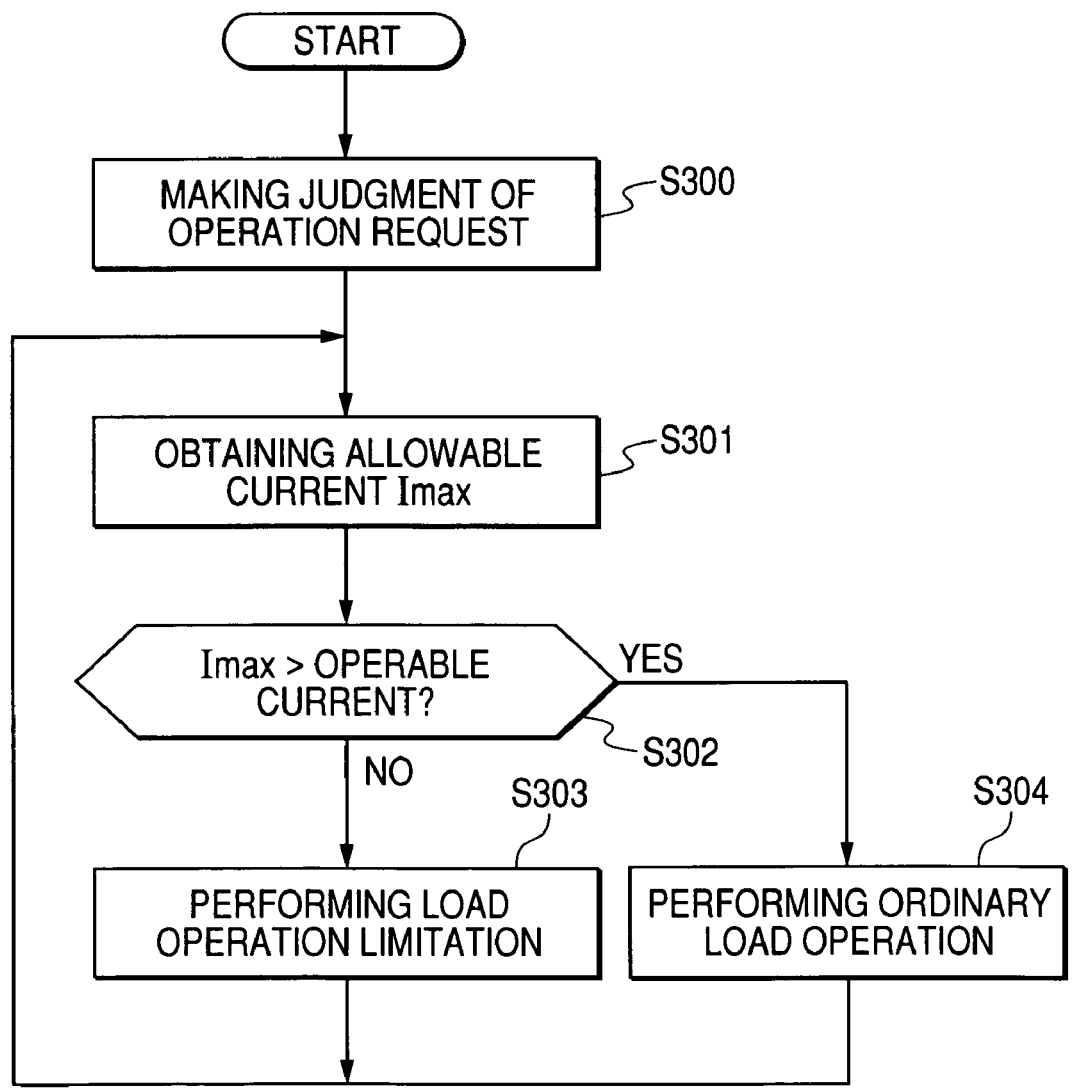
FIG. 9 is a flow chart showing an operation process of an operation limiting target system as a control target of the electric power supply control system for a vehicle according to the embodiment.

FIG. 9 is a flow chart showing the operation of the operation limiting target system as a control target of the electric power supply control system according to the embodiment.

Each of the operation limiting target systems 20 and 22 is independently operable based on the operation process shown in FIG. 9. The operation of the operation limiting target system 20 as one of them will now be explained.

When the driver of the vehicle turns ON the key switch (omitted from Figures), the operation limiting target system 20 initiates its operation.

The operation limiting target system 20 firstly judges in step S300 whether or not there is the "operation request", and then receives the allowable current message (a) shown in FIG. 2A transferred from the allowable current information unit 58, and gets the data regarding the allowable current Imax contained in the allowable current message (step S301).

The load-operation condition determining unit 20A then judges whether or not the allowable current Imax is larger than the operable current which is a current value capable of operating the corresponding load (such as the heater 94) without any limitation (step S302).

When the judgment result indicates that there is no margin, namely, when the allowable current Imax is not more than the operable current ("NO" in step S302), the load operation control unit 20B limits the operation of the corresponding load (step S303).

On the other hand, when the judgment result indicates that there is a margin, namely, when the allowable current Imax is more than the operable current ("YES" in step S302), the load operation control unit 20B does not perform any load limitation control for the corresponding load, so that the electrical load can operate without any limitation (as an "ordinary load operation", step S304).

Figure 10:
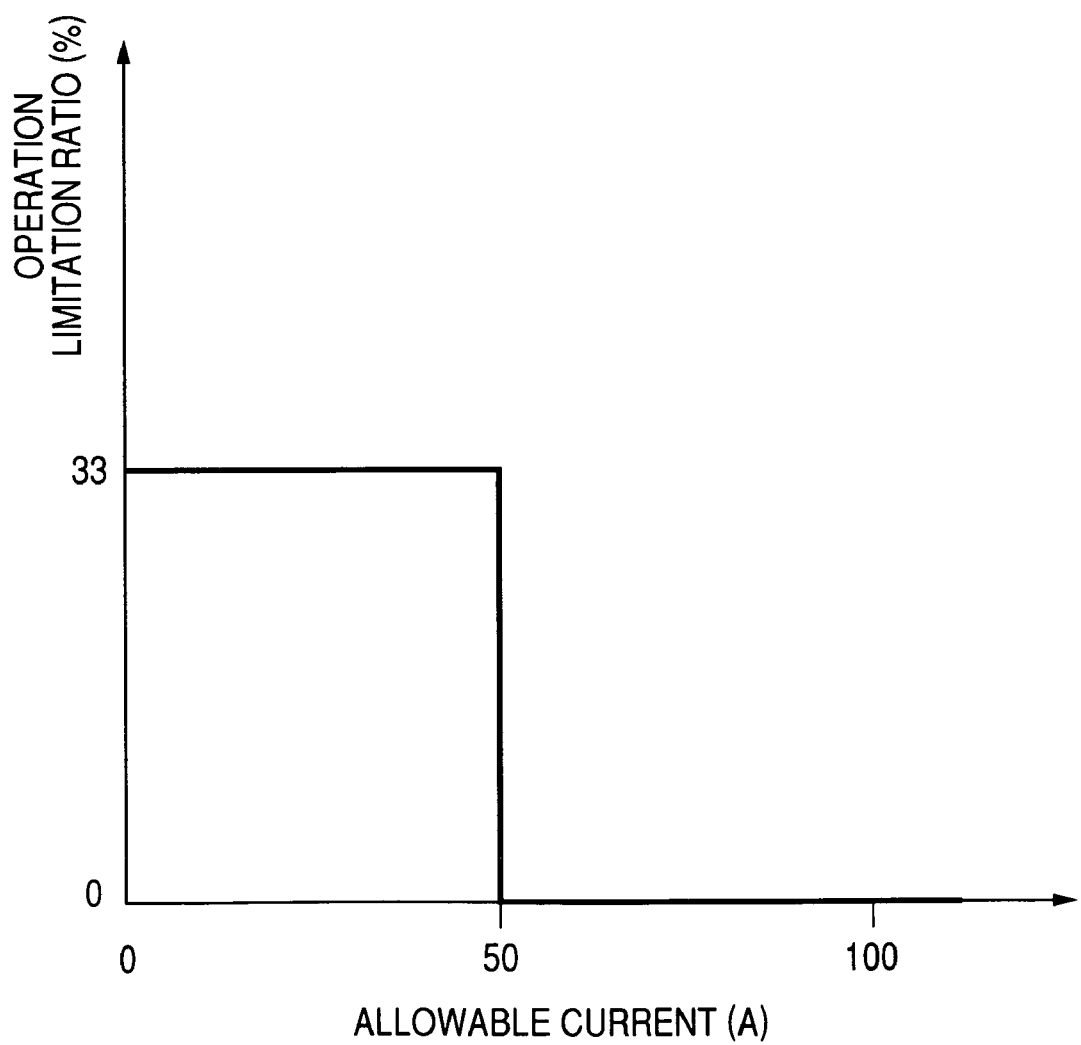
FIG. 10 is a view showing an operation limiting ratio to be used by the operation limiting target system.

FIG. 10 shows an operation limiting ratio to be used in the operation limiting target systems 20 and 22.

For example, the operable current is used in the judgment in step S302 is set to 50A. In FIG. 10, the lateral axis indicates the allowable current Imax (A), and the vertical axis indicates the operation limitation ratio (%). As clearly shown in FIG. 10, the allowable current Imax has no margin when the allowable current Imax is not more than 50A. In this case, the operation limiting target system 20 controls the corresponding load such as the heater 94 so that the operation limitation ratio becomes 33%, namely, the load current flowing through the heater 94 is decreased by 33%.

On the other hand, when the allowable current Imax is more than 50%, the allowable current Imax has an adequate margin, so that the operation limitation ratio is zero (0%), and the corresponding load such as the heater 94 can operate without any limitation of the load current.

The operation limiting target system 20 performs the series of operation in the flow chart shown in FIG. 9.

Figure 11:
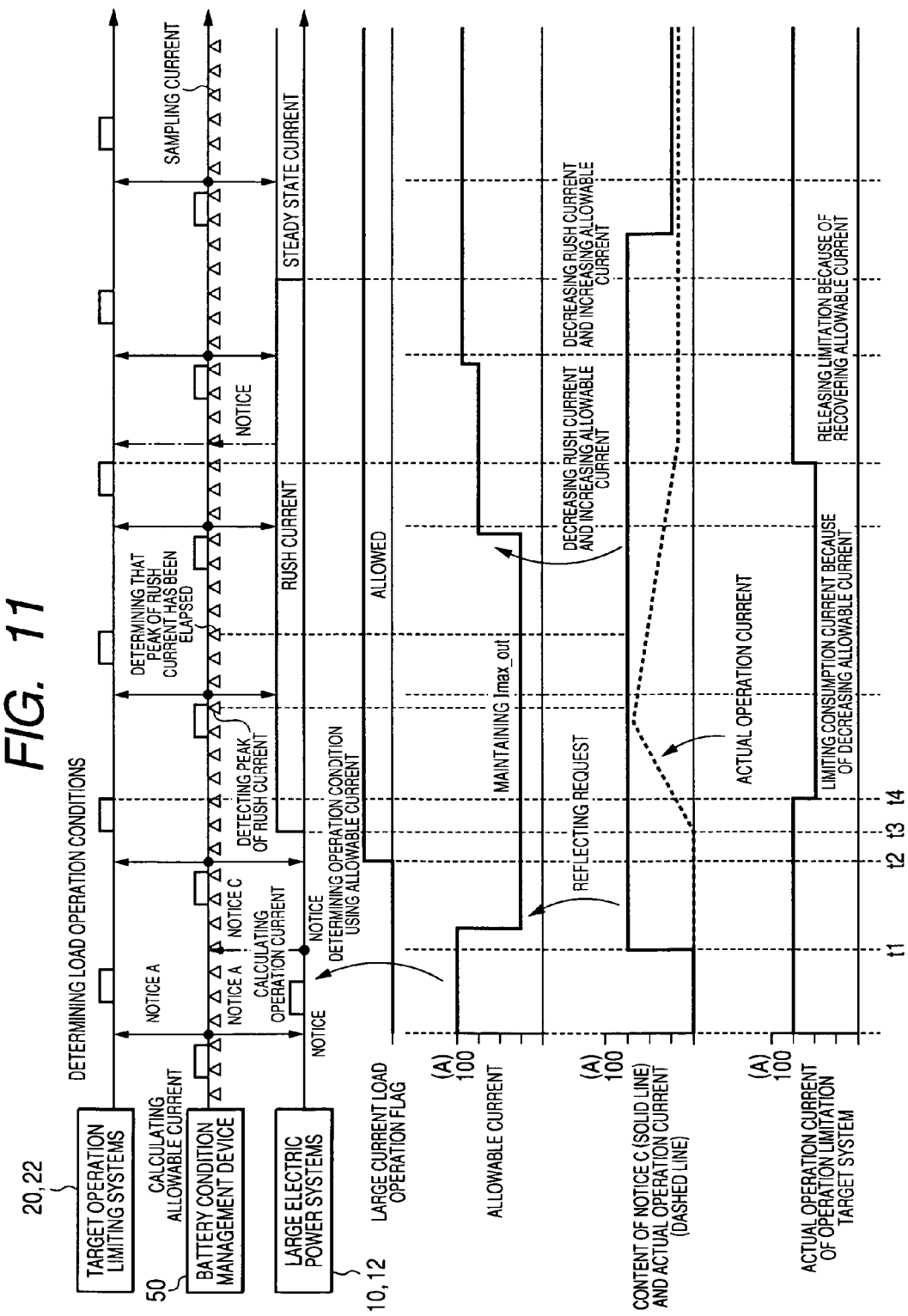
FIG. 11 is an entire operation sequence of the electric power supply control system for a vehicle according to the embodiment of the present invention.

FIG. 11 is an entire operation sequence of the electric power supply control system for a vehicle according to the embodiment of the present invention.

The notice A indicates the allowable current message (a) shown in FIG. 2A which is transferred from the battery condition management device 50 to the large electric power systems 10 and 12 and operation limiting target systems 20 and 22. The notice C indicates the load operation message, shown in FIG. 2C, which is transferred from the large electric power systems 10 and 12 to the battery condition management device 50. The lateral line indicates the elapsed of time.

At timing "t1", when the large electric power system 10 (or 12) transfers the load operation message shown in FIG. 2C to the battery condition management device 50, the allowable current Imax is decreased by the rush current Ip which is contained in this load operation message. The large current load initiates its operation corresponding to the large electric power system 10 when the large electric power system 10 receives the allowable current message at timing "t2" which is transferred from the battery condition management device 50, where the allowable current message provides the "operation permission". At timing "t3", the rush current is generated in the large current load when the large current load actually operates.

The operation limiting target systems 20 and 22 also receive the allowable current message at timing "t2". The operation limiting target systems 20 and 22 initiate the operation limitation based on the information regarding the allowable current Imax contained in the allowable current message at timing "t4". The operation limiting target systems 20 and 22 continue this "operation limitation" until the allowable current is increased according to decreasing the rush current.

As set forth, according to the electric power supply control system according to the embodiment of the present invention, it is possible to independently and automatically determine the operation condition of each of the operation limiting target systems 20 and 22 when there is no margin of the electric power to be supplied to the loads by transferring the data regarding the allowable current of a dischargeable amount of the battery 40. It is thereby possible to increase the safety, responsibility, and expansibility of the electric power supply control system when compared with those in the conventional systems performing the centralized power supply control.

By the way, the allowable current calculation unit 54 in the battery condition management device 50 obtains the rate of operation (or operational efficiency) of the electric power generation by the electric power generation devices 30 and 32. When there is a margin of the rate of operation (or operational efficiency), the allowable current calculation unit 54 sets zero to the current discharging current "Is" of the battery 40.

When the electric power generation devices 30 and 32 has a margin of the electric power generation, it is determined that the battery 40 is now charged. In this case of charging the battery 40, the battery 40 has the characteristics which are different from the voltage-current characteristics under the discharging state. When there is any discharging margin in the battery 40, it is possible to simply calculate the allowable current Imax without decreasing its calculation accuracy by setting zero to the value of the discharging current.

In the electric power supply control system for a vehicle according to the embodiment of the present invention, the allowable current Imax which is decreased by the rush current Ip is transferred to the operation limiting target systems 20 and 22 in order to keep the rush current Ip in advance which is required for initiating the large electric power systems 10 and 12. It is thereby possible that the operation limiting target systems 20 and 22 perform the control of the "operation limitation" when the allowable current is low, and possible to increase the allowable current which is used by the large electric power systems 10 and 12. It is therefore possible to keep the electric power for the large current loads corresponding to the large electric power systems 10 and 12 before they initiate their operation.

When the allowable current Imax exceeds the rush current Ip, because the battery condition management device 50 has transferred the "operation permission" information to the large electric power systems 10 and 12, it is possible that the large electric power systems 10 and 12 operate under the condition in which the voltage drop, caused by the rush current Ip generated on initiating the operation of each of the large electric power systems 10 and 12, is within the allowable range.

By the way, each of the large electric power systems 10 and 12 initiates its operation before receiving the "operation permission" information when the allowable current to be informed is not less than k-times of the rush current Ip, where k is the number of the large electric power systems 10 and 12 (k=2 in this embodiment). It is thereby possible to enhance the responsibility in operation of the large electric power systems 10 and 12 when the allowable current of the battery 40 is adequately larger than the rush current generated on initiating the operation of the large electric power systems 10 and 12.

The large electric power systems 10 and 12 are configured to increase the operation limitation ratio according to decreasing the allowable current in the notice to be provided. It is thereby possible for the operation limiting target systems 20 and 22 to automatically and independently perform the "operation limitation" in order to keep the current against the rush current generated on initiating the operation of the large electric power systems 10 and 12. This enables the large electric power systems 10 and 12 to stably control the operation limiting target systems 20 and 22.

The concept of the electric power supply control system for a vehicle according to the present invention is not limited by the embodiment described above. It is possible to modify the electric power supply control system within the scope of the present invention. For example, when receiving the rated electric generation current and the output current contained in the electric generation condition message shown in FIG. 2B transferred from the electric power generation devices 30 and 32 and when there is a margin of the rate of operation (or operational efficiency), it is possible for the allowable current calculation unit 54 to add as a margin current a difference of the rated electric generation current and the output current of each of the electric power generation devices 30 and 32.

When the electric power generation devices 30 and 32 have a margin of the generated electric power, it is possible for the electric power generation devices 30 and 32 to certainly supply the margin of the large electric power systems 10 and 12 and the electric power to the operation limiting target systems 20 and 22. This further guarantees the stability in operation of the operation limiting target systems 20 and 22.

[Modification]

A description will now be given of a modification of the electric power supply control system according to the embodiment of the present invention with reference to FIG. 12 to FIG. 14.

Figure 12:
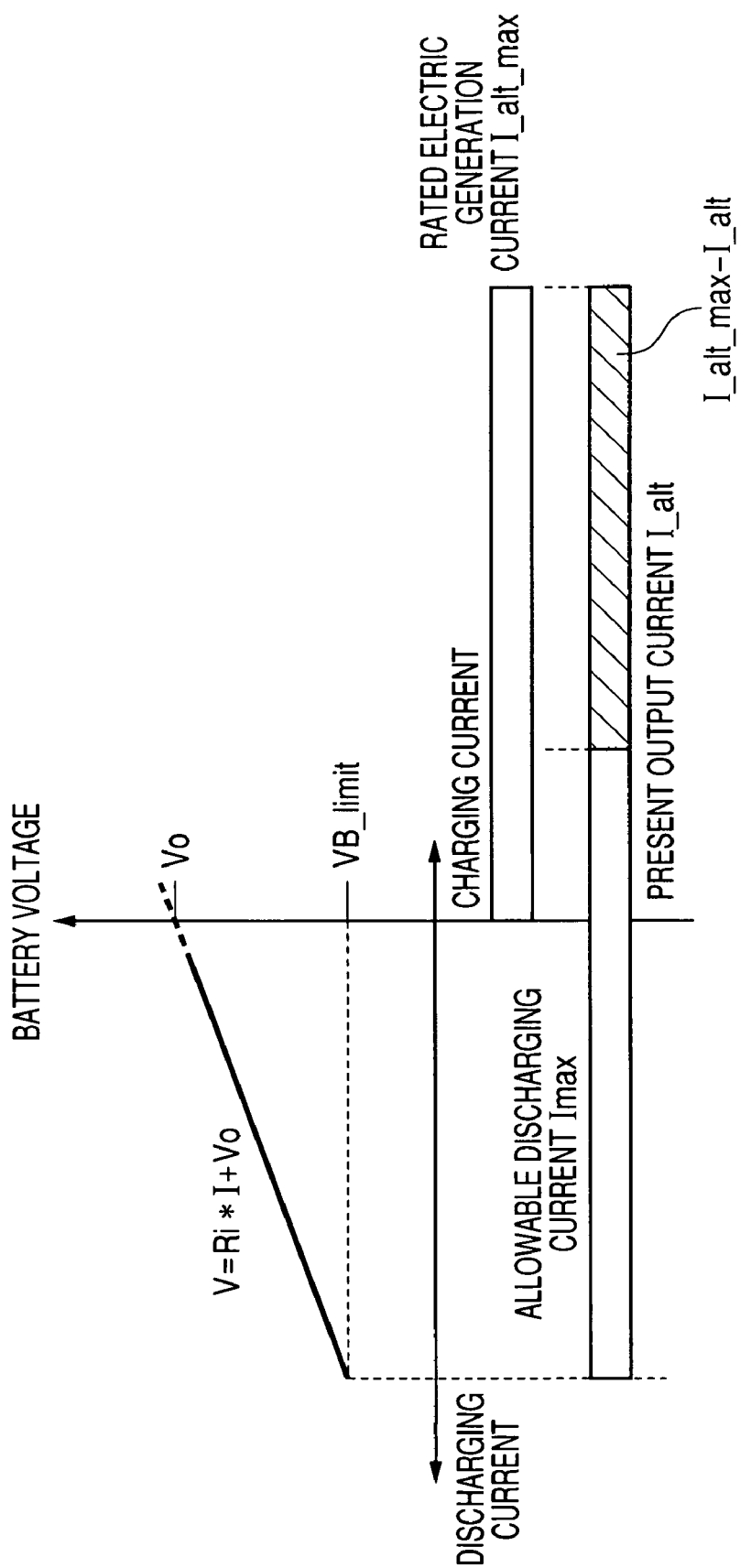
FIG. 12 shows a relationship between the battery discharging characteristics and an allowable current of the battery as a control target by the electric power supply control system as a modification of the embodiment according to the present invention.

FIG. 12 shows a relationship between the battery discharging characteristics and the allowable current of the battery 40 as a control target by the electric power supply control system as a modification of the embodiment according to the present invention.

In FIG. 12, the variable "I_alt_max" indicates the rated electric generation current of each of the electric power generation devices 30 and 32, and the variable "I_alt" indicates a currently output current of each of the electric power generation devices 30 and 32, respectively. Other variables are the same as those in the embodiment shown in FIG. 4. The explanation of the same variables is omitted here.

Because the difference "I_alt_max−I_alt" of the rated electric generation current "I_alt_max" and the output current "I_alt" is an available current to be increased according the conditions under which the electric power systems 10 and 12 are used when there is a margin of rate of operation (or operational efficiency), it is preferable to calculate the allowable current Imax at the time by adding the current which corresponds to this margin.

Figure 13:
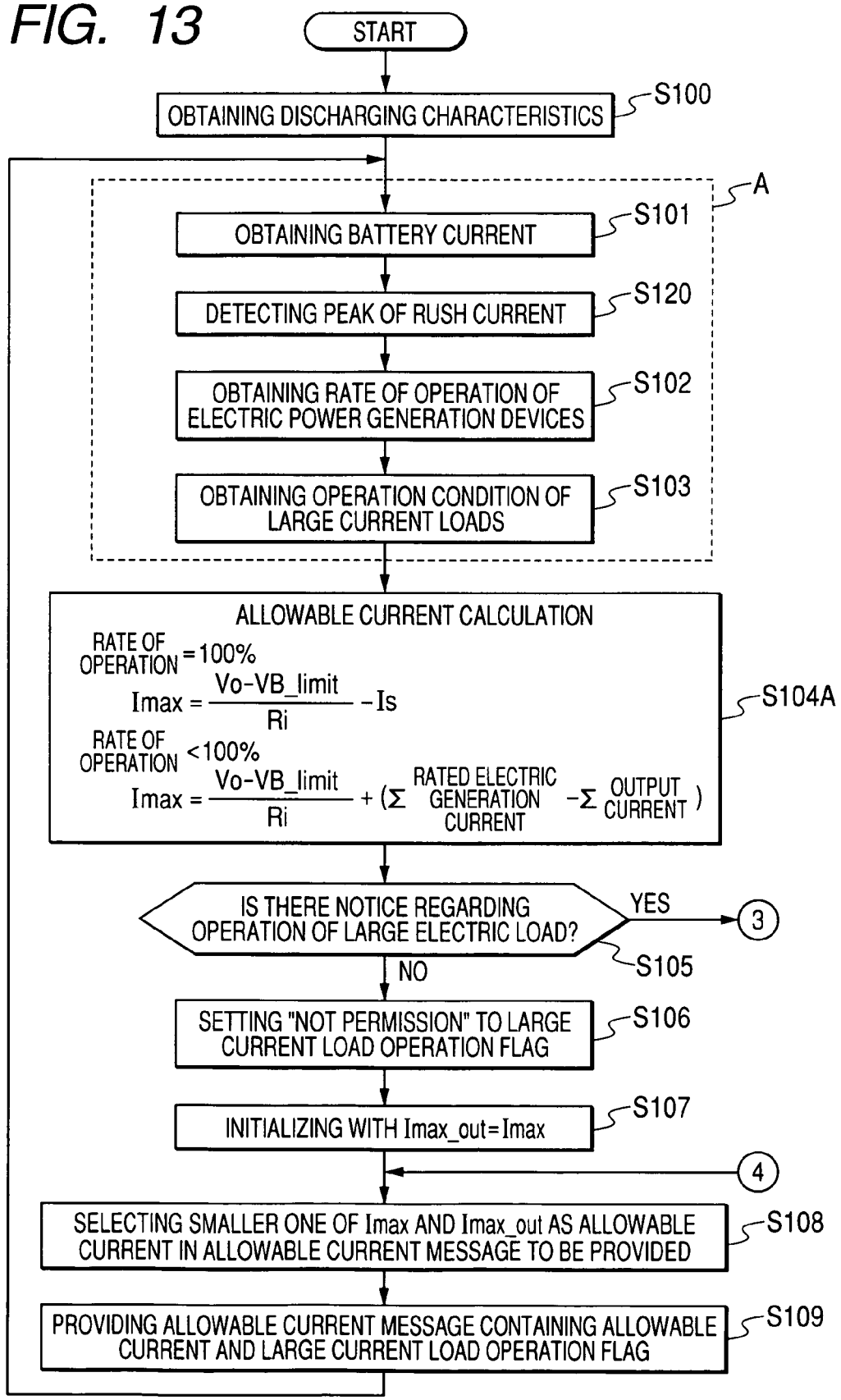
FIG. 13 is a flow chart showing a modification of the entire operation of the battery condition management device in the electric power supply control system as the modification of the embodiment according to the present invention.

FIG. 13 is a flow chart showing the modification of the entire operation of the battery condition management device 50 in the electric power supply control system as the modification of the embodiment according to the present invention. FIG. 14 is a flow chart showing the operation of the battery condition management device 50 in the electric power supply control system as the modification of the embodiment according to the present invention.

In the operation shown in FIG. 13, step S120 is added after step S101 and before step S102, and step 104 is replaced with new step S104A when compared with the operation shown in FIG. 6.

In added step S120, the allowable current calculation unit 54 detects a peak value of the rush current which is generated when each of the large electric power systems 10 and 12 initiate its operation. For example, when receiving the data regarding the actual rush current (designated by the dotted line shown in FIG. 3) transferred from each of the large electric power systems 10 and 12, the allowable current calculation unit 54 detects the peak of this rush current.

In new step S104A, when there is a margin of the rate of operation (or operational efficiency), the equation to be used for calculating the allowable current Imax is replaced with the following equation.

$$Imax=(Vo-VB\_limit)/Ri+(\Sigma \text{ rated electric power current}-\Sigma \text{ output current}).$$

The second term "(Σ rated electric power current−Σ output current)" in the right side of the above equation indicates the sum of the differences of the rated electric power current and the output current in all of the electric power generation devices 30 and 32. The allowable current Imax is calculated using the sum.

Figure 14:
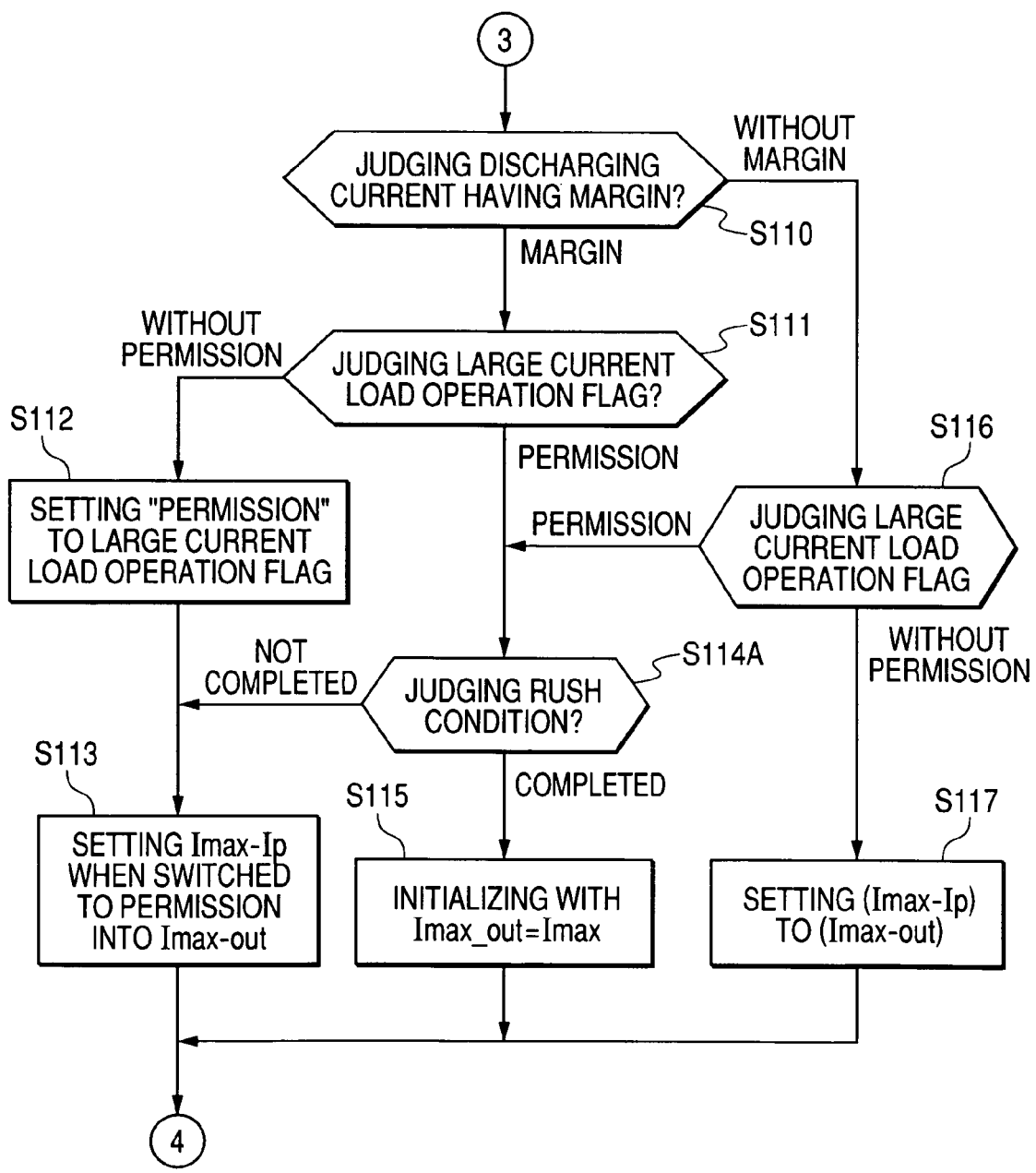
FIG. 14 is a flow chart showing the operation of the battery condition management device in the electric power supply control system as the modification of the embodiment according to the present invention.

In the operation shown in FIG. 14, step S114 is replaced with new step S114A when compared with the operation shown in FIG. 7. In step S114, the large electric load operation management unit 56 judges when the rush current is generated. Specifically,. the large electric load operation management unit 56 judges the fluctuation (increasing and decreasing of the current) every time the peak of the rush current of step S120 is sampled. For example, the large electric load operation management unit 56 detects that the timing of the peak of the rush current has been elapsed when the peak of the rush current detected at continuous three sampling timings is decreased. The large electric load operation management unit 56 then judges that the rush state is completed.

When this judgment of the completion of the rush current is issued or when the rush period time "Ts" is elapsed, it is judged that the rush current state has been completed (step S114A), and the operation progresses to step S115. On the other hand, if it is judged that the rush current state has not been completed (step S114A), the operation goes to step S113.

As set forth, because the allowable current Imax is set by eliminating the rush current, which is kept in advance, when the peak of the actual rush current is completed, it is possible to avoid applying any unnecessary operation limitations to the operation limiting target systems 20 and 22.

In the modifications shown in FIG. 13 and FIG. 14, although step S104 is replaced with new step S104A, step 120 is added, and step S114 is replaced with step S114A, it is possible to perform the replacement of one of the steps S104A and step S114A.

Still further, the embodiment prescribed above uses the allowable current Imax. The voltage potential of electric power cables through which the electric power is supplied to the battery 40, the large electric power system 10 and the like is changed according to the electric power generation condition of the electric power generation devices 30 and 32. In order to accurately calculate the margin of the terminal voltage of the battery 40 until the limitation voltage VB_limit, it is necessary to use the allowable electric power instead of using the allowable current Imax. Therefore it is acceptable to use the allowable electric power instead of the allowable current in order to increase the accuracy of the management of the battery condition.

(Other Features of the Present Invention)

In the electric power supply control system as another aspect of the present invention, it is possible for the allowable electric power calculation means to use an allowable current instead of the allowable electric power. This eliminates the multiplication process of the current and the voltage in order to obtain the allowable electric power, and thereby makes it possible to increase the calculation speed of the electric power supply control system. This can also decrease the total cost of the electric power supply control system.

In the electric power supply control system as another aspect of the present invention, the allowable electric power calculation means obtains the rate of operation (or operational efficiency) of the electric power generation of the electric power generation devices, and sets the present discharging current of the battery to zero, and calculates the allowable current using the present discharging current of zero when the electric power generation devices has a margin of the rate of operation (or operational efficiency). It is determined that the battery is currently charged when the electric power generation devices have a margin to generate the electric power. In general, the characteristics during the charging state of the battery are different from the characteristics during the discharging state of the battery. However, when the value "zero" is set to the discharging electric power during the charging state of the battery, it is possible to simply calculate the allowable electric power without decreasing the calculation accuracy.

In the electric power supply control system as another aspect of the present invention, the allowable electric power calculation means obtains a rated electric generation current and an output current of the electric power generation devices. The allowable electric power calculation means calculates a difference of the rated electric generation current and the output current as a margin current, and adds the margin current to the allowable current when the electric power generation devices has a margin in the rate of operation (or operational efficiency).

When the electric power generation devices have a margin to generate the electric power, the battery condition management device certainly supplies the electric power corresponding to the margin to the primary and secondary electric power systems by adding the current corresponding to the margin of the electric power to the allowable current which is obtained based on the discharging characteristics of the battery. It is thereby possible that the primary and secondary electric power systems further stably operate.

In the electric power supply control system as another aspect of the present invention, the primary electric power system provides a notice of a rush current which is generated on initiating its operation to the allowable electric power calculation means. The allowable electric power calculation means receives the notice of a rush current transferred from the primary electric power system, and subtracts the rush current from the allowable current. Still further, the allowable electric power notice means provides a notice of the difference, as a result of the above subtraction, to the primary electric power system and the secondary electric power system.

According to the present invention, in order to keep in advance the amount of the rush current for initiating the operation of the primary electric power system, the allowable electric power notice means provides the notice regarding the decreased allowable current to the secondary electric power system. On the other hand, the notice regarding the increased allowable current is supplied to the primary electric power instead. It is thereby possible to certainly supply the adequate amount of the electric power to the primary electric power system. It is thereby possible to supply the adequate amount of electric power to the large electric power load in the primary electric power system before initiating the operation of the large electric load.

In the electric power supply control system as another aspect of the present invention, the allowable electric power calculation means provides the notice of the allowable current obtained by subtracting the rush current after the rush current is generated in the primary electric power system.

According to the present invention, even if the secondary electric power system performs its operation limitation and the primary electric power system uses the increased allowable current instead, the allowable electric power notice means continuously provides the notice of the decreased allowable current to the secondary electric power system in order to continuously supply an adequate amount of the allowable current to the primary electric power system. Therefore the supply of electrical power is provided to the primary electric power system in a stable and sure fashion.

In the electric power supply control system as another aspect of the present invention, the primary electric power system provides a notice of a rush current generation period in which the rush current is generated in the primary electric power system to the battery condition management device, and the allowable electric power notice means stops providing any information about notice of the allowable current until the rush current generation period is elapsed.

According to the present invention, it is possible to supply an adequate amount of electric power to the primary electric power system for the period of time of the rush current in order to initiate the operation of the primary electric power system. This can avoid any excess limitation from the secondary electric power system.

In the electric power supply control system as another aspect of the present invention, the battery condition management device detects the rush current which is generated on initiating the operation of the primary electric power system after receiving the notice of an amount of the rush current transferred from the primary electric power system. The allowable electric power notice means provides the notice of the allowable current after a peak of the rush current is elapsed.

Because the limitation of the allowable current is released after completion of the peak of the rush current which is generated during initiating the operation of the primary electric power system, it is possible to avoid any excess limitations to the secondary electric power system.

In accordance with another aspect of the present invention, the electric power supply control system further has an electric load operation management means which is configured to transfer an instruction to the primary electric power system to permit initiating its operation when the allowable current exceeds the rush current.

According to the present invention, it is possible that the primary electric power system certainly operates under the voltage drop within an allowable range caused by the rush current generates by initiating the operation of the primary electric power system.

In the electric power supply control system as another aspect of the present invention, the primary electric power system comprises K-devices (K is an integer), and the devices forming the primary electric power system initiate the operation thereof when the allowable current is not less than K-times of the rush current.

When the allowable current of the battery is adequately larger than the rush current which is generated by initiating the operation of the primary electric power system, it is possible to enhance the responsibility of operation of the primary electric power system.

In the electric power supply control system as another aspect of the present invention, the secondary electric power system is so set that limitation in operation of the secondary electric power system is increased according to decreasing the allowable current to be provided with the notice.

According to the present invention, it is possible to automatically perform the limitation of operation in the secondary electric power system in order to keep and supply the adequate amount of electric power for the rush current which would be generated in the primary electric power system. This can further enhance the stability of both the primary electric power system and the secondary electric power system.

While specific embodiments of the present invention have been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the present invention which is to be given the full breadth of the following claims and all equivalent thereof.

What is claimed is:

1. An electric power supply control system for a vehicle comprising:
    a battery;
    electric generation devices;
    a primary electric power system which is operable on receiving an electric power and generates a rush current on initiating its operation;
    a secondary electric power system, the operation of which being limited according to demand during the operation of the primary electric power system; and
    a battery condition management device configured to manage the condition of the battery, comprising:
        battery monitoring means configured to detect a charging/discharging current of the battery, and obtain discharging characteristics of the battery;
        allowable electric power calculation means configured to calculate an allowable electric power of the battery with which the battery is dischargeable until a terminal voltage of the battery drops down to a predetermined limit voltage based on the discharging characteristics and discharging current of the battery; and
        allowable electric power notice means configured to provide a notice of the allowable electric power to the primary electric power system and the secondary electric power system,
    wherein each of the primary electric power system and the secondary electric power system changes its operation based on the notice of the allowable electric power in order to maintain the terminal voltage of the battery over the limit voltage.

2. The electric power supply control system according to claim 1, wherein
    the allowable electric power calculation means is configured to calculate an allowable current of the battery with which the battery is dischargeable until a terminal voltage of the battery drops down to a predetermined limit voltage based on the discharging characteristics and discharging current of the battery, and the allowable electric power notice means is configured to provide the notice of the allowable current to the primary electric power system and the secondary electric power system, and
    wherein each of the primary electric power system and the secondary electric power system changes its operation based on the notice of the allowable current in order to maintain the terminal voltage of the battery over the limit voltage.

3. The electric power supply control system according to claim 2, wherein the allowable electric power calculation means obtains a rate of operation of the electric power generation in the electric power generation devices, sets zero to a present discharging current of the battery, and then calculates the allowable current using the present discharging current of zero when the electric power generation devices has a margin of the rate of operation.

4. The electric power supply control system according to claim 3, wherein the allowable electric power calculation means obtains a rated electric generation current and an output current of the electric power generation devices, calculates a difference of the rated electric generation current and the output current as a margin current, and adds the margin current to the allowable current when the electric power generation devices has a margin in the rate of operation.

5. The electric power supply control system according to claim 2, wherein the primary electric power system provides a notice of a rush current on initiating its operation to the allowable electric power calculation means, and
    the allowable electric power calculation means receives the notice of the rush current transferred from the primary electric power system, and subtracts the rush current from the allowable current, and
    the allowable electric power notice means provides a notice of the difference which is obtained by the subtraction to the primary electric power system and the secondary electric power system.

6. The electric power supply control system according to claim 5, wherein the allowable electric power calculation means provides a notice of the allowable current obtained by subtracting the rush current after completion of generating the rush current on initiating the operation of the primary electric power system.

7. The electric power supply control system according to claim 6, wherein the primary electric power system provides a notice of a rush current generation period in which the rush current is generated in the primary electric power system to the battery condition management device, and the allowable electric power notice means halts to provide the notice the allowable current until the rush current generation period is elapsed.

8. The electric power supply control system according to claim 6, wherein the battery condition management device detects the rush current which is generated on initiating the operation of the primary electric power system after receiving the notice of an amount of the rush current transferred from the primary electric power system, and
    the allowable electric power notice means provides the notice of the allowable current after a peak of the rush current is elapsed.

9. The electric power supply control system according to claim 5, further comprises electric load operation management means configured to transfers an instruction to the primary electric power system to permit initiating its operation when the allowable current exceeds the rush current.

10. The electric power supply control system according to claim 5, wherein the primary electric power system comprises K-devices (K is an integer), and the devices forming the primary electric power system initiate the operation thereof when the allowable current is not less than K-times of the rush current.

11. The electric power supply control system according to claim 2, wherein the secondary electric power system is so set that limitation in operation of the secondary electric power system is increased according to decreasing the allowable current to be provided with the notice.

* * * * *